United States Patent
Gao et al.

(10) Patent No.: US 10,152,725 B2
(45) Date of Patent: Dec. 11, 2018

(54) SYSTEMS AND METHODS FOR SELECTING A PRODUCT SALES CHANNEL

(71) Applicant: General Wireless IP Holdings LLC, Fort Worth, TX (US)

(72) Inventors: Yuan Gao, Flower Mound, TX (US); Huey Paul Long, Jr., Fort Worth, TX (US); Srikanth Keelapudi Reddy, Farmers Branch, TX (US)

(73) Assignee: General Wireless IP Holdinigs LLC, Fort Worth, TX (US)

( * ) Notice: Subject to any disclaimer, the term of this patent is extended or adjusted under 35 U.S.C. 154(b) by 801 days.

(21) Appl. No.: 14/150,054

(22) Filed: Jan. 8, 2014

(65) Prior Publication Data

US 2015/0193791 A1    Jul. 9, 2015

(51) Int. Cl.
*G06Q 30/02* (2012.01)
(52) U.S. Cl.
CPC .............................. *G06Q 30/0202* (2013.01)
(58) Field of Classification Search
None
See application file for complete search history.

(56) References Cited

U.S. PATENT DOCUMENTS

| | | | |
|---|---|---|---|
| 8,484,099 B1* | 7/2013 | Pope | G06Q 30/0278 705/26.7 |
| 9,129,249 B2* | 9/2015 | Hu | G06Q 10/087 |
| 2003/0233246 A1 | 12/2003 | Snapp et al. | |
| 2005/0004837 A1* | 1/2005 | Sweeney | G06Q 30/02 705/14.16 |
| 2010/0217650 A1 | 8/2010 | Hartnell | |
| 2012/0190386 A1* | 7/2012 | Anderson | G01C 15/04 455/456.3 |
| 2013/0297422 A1* | 11/2013 | Hunter | G06Q 30/0261 705/14.58 |
| 2013/0339083 A1* | 12/2013 | Baier | G06Q 30/02 705/7.29 |
| 2013/0339133 A1* | 12/2013 | Oki | G06Q 30/0246 705/14.45 |

(Continued)

OTHER PUBLICATIONS

Non-Final Office Action dated Jul. 28, 2017, from the U.S. Patent and Trademark Office relating to U.S. Appl. No. 15/205,174.

(Continued)

*Primary Examiner* — Thomas L Mansfield
(74) *Attorney, Agent, or Firm* — Honigman Miller Schwartz and Cohn LLP

(57) ABSTRACT

Methods and systems for determining a sales channel for a product in a brick and mortar store include displaying to customers in a brick and mortar store information on an interactive data collection system relating to a product; collecting, via the data collection system, information indicative of customer interest in the product by tracking inputs at the interactive data collection system; collecting, via an online website, information indicative of customer interest relating to the product; and based upon both the information obtained at the brick and mortar store and the information obtained by the online website, determining a sales channel from a plurality of channels to offer the product for purchase by a customer.

20 Claims, 9 Drawing Sheets

(56) References Cited

U.S. PATENT DOCUMENTS

2013/0339199 A1* 12/2013 Patt .................... G06Q 10/087
                                                      705/28
2014/0279294 A1   9/2014 Field-Darragh et al.
2015/0112838 A1   4/2015 Li et al.

OTHER PUBLICATIONS

Final Office Action dated Mar. 30, 2018, from the U.S. Patent and Trademark Office relating to U.S. Appl. No. 15/205,174.

* cited by examiner

SYSTEMS AND METHODS FOR SELECTING A PRODUCT SALES CHANNEL

FIELD OF THE INVENTION

The present disclosure relates generally to systems and methods for selecting a sales channel through which a product is offered for sale to customers. More particularly, the present disclosure relates to systems and methods for selecting a sales channel in a brick and mortar store to increase customer experience and drive product sales.

BACKGROUND

Conventional online product distribution sites utilize product metrics, such as number of sales, searches, and customer information to track consumer interest and product retail success. This information may then be used to aid in product advertising or product pricing to capitalize on profitable products. Likewise, conventional brick and mortar stores utilize product metrics to track consumer interest and retail success.

However, these online system and brick and mortar stores do not share product metrics and use them to identify in-store sales channels that will provide a desired return, such as a maximum return, on a product offered for sale in the brick and mortar store.

The systems and methods described herein overcome one or more of the deficiencies of the prior art.

SUMMARY

In an exemplary aspect, the present disclosure is directed to a method for determining a sales channel for a product in a brick and mortar store. The method may include displaying to customers in a brick and mortar store information on an interactive data collection system relating to a product; collecting, via the data collection system, information indicative of customer interest in the product by tracking inputs at the interactive data collection system; collecting, via an online website, information indicative of customer interest relating to the product; and based upon both the information obtained at the brick and mortar store and the information obtained by the online website, determining a sales channel from a plurality of channels to offer the product for purchase by a customer.

In an exemplary aspect, the present disclosure is directed to a system for determining a sales channel for a product in a brick and mortar store. The system may include an interactive data collection system on display to customers in a brick and mortar store, the interactive data collection system displaying information relating to a product. The system also may include a customer insight and competitive management (CICM) engine configured to collect, via the data collection system, information indicative of customer interest in the product by tracking inputs at the interactive data collection system, the CICM engine also being configured to collect information from an online website indicative of customer interest relating to the product. The system may also include a profitability profile engine configured to receive the information indicative of customer information from the data collection system and determine a sales channel from a plurality of channels to offer the product for purchase by a customer.

In another exemplary aspect, the present disclosure is directed to a method for determining a sales channel for a product in a brick and mortar store. The method may include collecting information indicative of customer interest in a product by tracking searches made through a wireless network in the brick and mortar store; collecting, via an online website, information indicative of customer interest relating to the product; and based upon both the information obtained at the brick and mortar store and the information obtained by the online website, determining a sales channel from a plurality of channels to offer the product for purchase by a customer. In an aspect, the method may include displaying to customers in a brick and mortar store information on an interactive data collection system relating to a product; collecting, via the data collection system, information indicative of customer interest in the product by tracking inputs at the interactive data collection system; and based upon the information obtained at the data collection system, determining a sales channel from a plurality of channels to offer the product for purchase by a customer.

It is to be understood that both the foregoing general description and the following drawings and detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following.

BRIEF DESCRIPTION OF THE DRAWINGS

The accompanying drawings illustrate embodiments of the devices and methods disclosed herein and together with the description, serve to explain the principles of the present disclosure.

DETAILED DESCRIPTION

Figure 1:
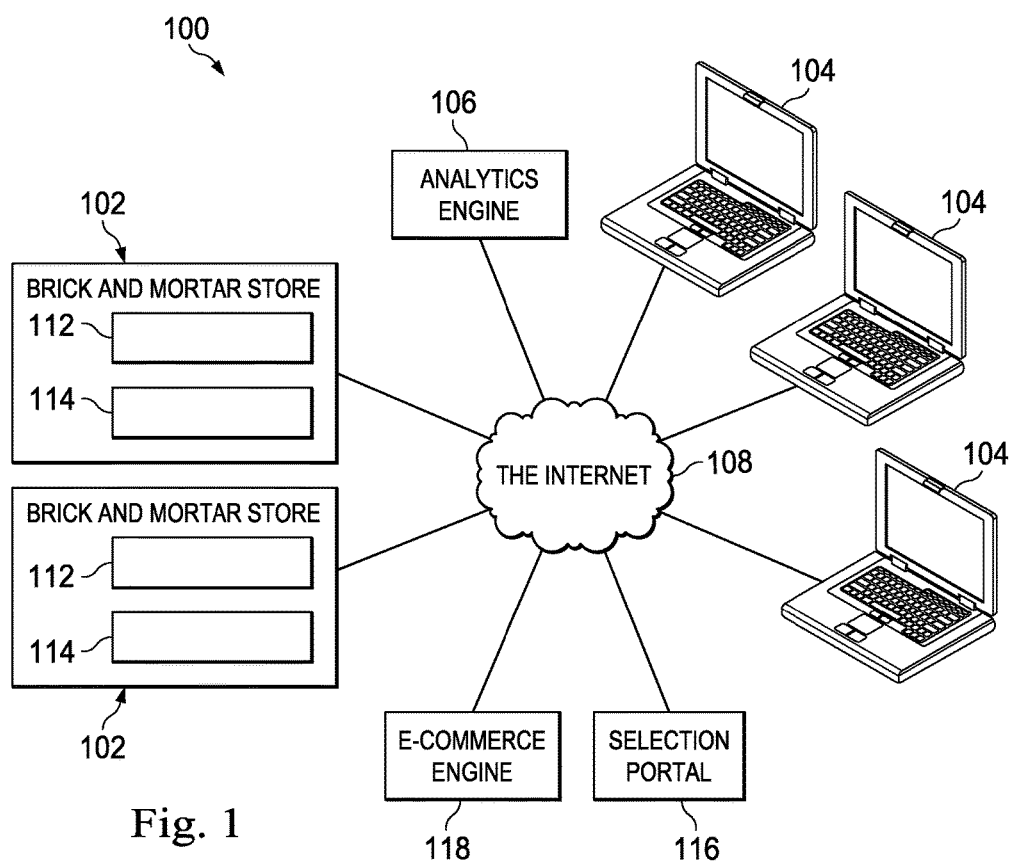
FIG. 1 is a block diagram showing a system network according to an exemplary aspect of the present disclosure.

For the purposes of promoting an understanding of the principles of the present disclosure, reference will now be made to the embodiments illustrated in the drawings, and specific language will be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For simplicity, in some instances the same reference numbers are used throughout the drawings to refer to the same or like parts.

The present disclosure relates generally to systems and methods for increasing customer traffic by presenting to the customer the most relevant products in the most applicable sales channel, which could lead to increased customer satisfaction. Presenting the most relevant products in the most applicable sales channel may apply to both online product placement and brick and mortar product placement based on data analysis and tracking. The system utilizes multiple levels of sales channels in both brick and mortar stores and in online sales websites to market products to customers in an effective and profitable manner to increase customer selection, satisfaction, and drive sales volumes. The sales channels in the brick and mortar stores represented physical locations in the brick and mortar stores, and the system disclosed herein calculates and outputs a profitability profile for a product that corresponds to a sales channel appropriate for the product to generate a desired return. The system may take into account multiple factors that contribute to profitability including, for example demand, customer interest, size, information obtained from local in-store sales as well as on-line sales, and other factors that contribute to the overall profitability of a single product. Accordingly, product placement at brick and mortar stores is driven by overall metrics including information from the brick and mortar stores and information relative to the product obtained via online channels.

FIG. 1 shows a high-level view of a continuous channel system 100 that may increase customer interest in both an online marketplace and brick and mortar stores. This in turn may increase customer satisfaction, while at the same time increasing economic benefit through product placement. The continuous channel system 100 includes a plurality of brick and mortar stores 102, online shopping devices 104, an analytics engine 106, a selection portal 116, and a commerce engine 118 connected via a network 108.

The network 108 may be a wide area network (WAN) such as the internet that may enable communication of information relating to, for example and without limitation, purchasing, product information, and the overall profitability of a product offered for sale. In some embodiments, the network 108 includes a plurality of local area networks (LANs) connected to one or more WANs and includes an appropriate combination of common carrier analog and digital transmission networks. Multiple LANs may be connected via bridges or routers to WANs and to one another. In some examples, the analytics engine 106, the selection portal 116, and/or the commerce engine 118 are a part of a common server or otherwise in direct communication, bypassing the network 108.

The brick and mortar stores 102 may be conventional stores displaying and selling product to consumers. In addition, each of the exemplary brick and mortar stores 102 includes one or more data collection systems 110 that collect and track customer data and product data that may be used to evaluate interest in products or to generate product profiles. Information obtained may be communicated to the analytics engine 106 for processing or additional tracking. Products may be sold to brick and mortar store customers using conventional systems, such as point of purchase transaction systems or may be purchased online for instore pickup.

The data collection systems 110 at the brick and mortar stores 102 may include one or more of a point of purchase transaction system 112 and an interactive product display 114. In some embodiments, the point of purchase transaction system 112 and the interactive product display 114 are the same device (e.g., a customer owned smartphone running a mobile purchasing application that may provide interactive in-store experience and transactions). In some embodiments, the point of purchase transaction system 112 may be a register operated by a store employee to transact business and to connect to a customer database on the analytics engine 106 in order to upload or download data. For example, the point of purchase transaction system 112 may capture identifying information for a customer, purchase methods and history, upgrade eligibility for products, loyalty program participation and history, and other information. The identifying information of the customer may include a customer address, email, address, phone numbers, and other information.

The interactive product display 114 may be an interactive in-store display available to customers that permits customers to search, browse, or otherwise view one or more particular products selected by the merchant. In some examples, the interactive product display 114 is an e-surface display employing a touch screen display that shows products or information relating to products to customers. Customer interaction with the interactive product display 114 may be captured and stored and used to indicate the level of customer interest in the products displayed. For example, the interactive product display 114 may identify a number of selected products and invite customers to select a particular product on the display to obtain more information. As such, the interactive product display 114 may capture indicators of customer interest and other information. The browser history from the interactive product display 114 and other customer inputs may become a part of a calculation of the product profitability profiles.

The online shopping devices 104 may be conventional consumer computers, whether handheld, portable, desktop, workstations, smartphones, tablets, smart watches, Google glass, or other consumer interfacing devices or computers that access a merchant website hosted by the analytics engine 106. In some aspects, these may be located remote from the brick and mortar stores 102. The merchant website may show and the online shopping devices 104 may access products for sale by the merchant and related product information. For example, the online shopping devices 104 may access products or product listings, may conduct product searches, and may enable online product purchases that may be either picked-up at the brick and mortar stores 102 or other distribution location or may be delivered via a standard carrier, such as the Postal service, UPS, or Federal Express, for example. In some instances, the delivery may be made from the brick and mortar stores 102, while in other instances, the delivery may be made from a non-local distribution site (not shown). In order to track interest in product offerings, the product search queries and products viewed via the online shopping devices 104 may be stored in the analytics engine 106 in order to create a product profile regarding interest in the product by the online shopping devices 104.

The analytics engine 106 is one or more servers in communication with or otherwise configured to receive information from and transmit information to the brick and mortar stores 102, the selection portal 116, the commerce engine 118 and/or the online shopping devices 104. The analytics engine 106 is configured and arranged to receive customer information and data captured from the brick and mortar stores 102 and the online shopping devices 104. It also receives data regarding each product offered for sale including information relating to the product's size, shipping or logistics, consumer interest, price point, availability, and other information from the selection portal 116 and the commerce engine 118. Using this information, the analytics engine 106 may generate product profitability profiles usable to identify products with higher returns and products with lower returns and usable to market the products within specific product sales channels based on this information that may maximize the return for a specific product or group of products. In addition, the analytics engine 106 may automatically assign a particular product to a sales channel through which the product may be offered for sale to consumers. As used herein, the term consumer is intended to include any purchaser including wholesale retailer, special groups, and the public at large. The analytics engine 106 receives information about products from the online website represented by the commerce engine 118. The information may be obtained when a customer accesses the online website via online shopping devices 104. The analytics engine 106 also receives information relating to products from the brick and mortar stores 102. By relying upon information obtained from both the online website and the brick and mortar stores, the analytics engine 106 is able to dictate the treatment or handling of a product at either the brick and mortar stores 102 and on the online website. Thus, based on parameters or factors relating to the product gathered from both online and in-store interactions, the analytics engine 106 is configured to create a product profitability profile for every product to identify those that have more profitability than others. As used herein, the profitability profile represents the economic value of the product to the merchant.

The selection portal 116 and commerce engine 118 are described further below with reference to FIG. 2.

Figure 2:
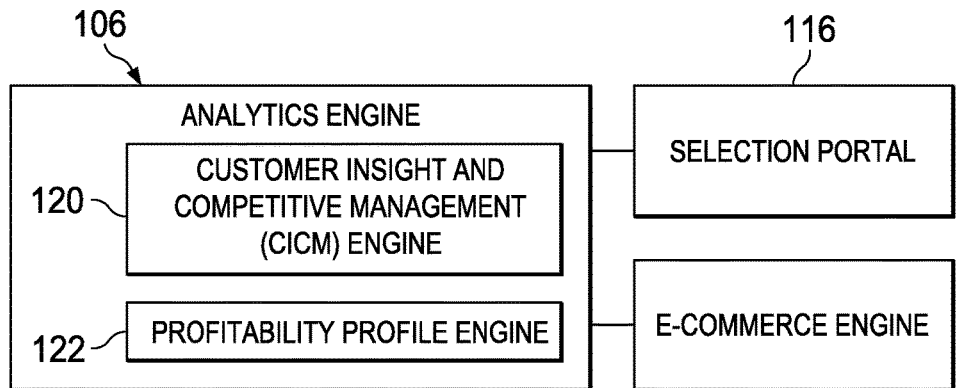
FIG. 2 is a block diagram showing an exemplary analytics engine that may be used by the system network of FIG. 1 according to an exemplary aspect of the present disclosure.

As shown in FIG. 2, the analytics engine 106 comprises, among other engines, a customer insight and competitive management (CICM) engine 120 and a profitability profile engine 122. The analytics engine 106 may be formed of a single server or multiple servers that may be in the same location or may be in separate locations. Further, each of the CICM engine 120 and the profitability profile engine 122 may be located on a single server or multiple servers that may be located at the same location or at separate locations.

The CICM engine 120 is configured to arrange, organize, and store customer data as it may relate to particular products. This information may be obtained from the brick and mortar stores 102 and from the merchant website or from other locations. For example customer data may include shopping habits, search histories, and other information obtained via the data collection systems 110 in the brick and mortar stores 102 and information obtained at the merchant website as provided via the online shopping devices 104. The CICM engine 120 may include other information including customer lists, loyalty program information, and other information relating to customers.

The profitability profile (PP) engine 122 is configured to receive or calculate information relating to each product and, based upon customer interest and other factors, provide an indication of the best sales channel for a particular product for sale vis a vis other products for sale. Based on the information in the profitability profile engine 122, information in the CICM engine 120, and other information that may be stored in or accessed by the analytics engine 106, the profitability profile engine 122 makes granular recommendations on product selection, pricing, presentation, inventory allocation, and marketing by sales channels. Therefore, the profitability profile engine is configured to create a product profitability profile and compare each product in order to determine a suitable sales channel for any single product vis a vis other products offered for sale. That is, based on the product profitability profile for any product, the profitability profile engine 122 may recommend or assign the product to a sales channel. Further, as the profitability profile of a product changes based on customer interest and other factors described below, the profitability profile engine 122 may reassign the products to alternative channels or may take other actions to enable the products having the highest profitability profile to be presented to the customers in a way providing a suitable return.

The selection portal 116 is in communication with the analytics engine 106 and communicates information relating to particular products to the analytics engine 106 for analysis and processing. The selection portal 116 may be accessed by and the product information may be input by a merchant, a vendor, or other distributor with a product to be introduced to or assessed by the analytics engine 106. In some embodiments, the selection portal 116 forms a part of the commerce engine 118. Information relating to the product that may be input to the selection portal 116 may include, among other information, pricing, cost of goods sold, space requirements, shipping weights, estimated time to sale, similar SKUs, MDF (market development funding), expected volume, and other factors relating to the product and expectations.

The commerce engine 118 includes an online merchant website allowing customers to view products, search for products, and purchase products from the merchant using the online shopping devices 104 (FIG. 1). The commerce engine 118 may include an online shopping cart and may be in communication with payment processing systems, the CICM engine 120, and other databases or servers that may assist in a product purchase transaction. It may also include or obtain product review information, information regarding related products, and other information. From the commerce engine 118, a customer may find or browse products available for purchase and may purchase the product. Purchased products may be shipped to the customer using a standard carrier, may be picked up at a brick and mortar store 102 in some cases, or may be delivered from a brick and mortar store or local distribution point, as desired. The commerce engine 118 may also provide information to the analytics engine 106 via network 108 or other connection. Exemplary information includes, without limitation, product information such as customer sales, views, searches, viewing lengths, hits by location or region, and other information relating to products presented on the commerce engine.

Figure 3:
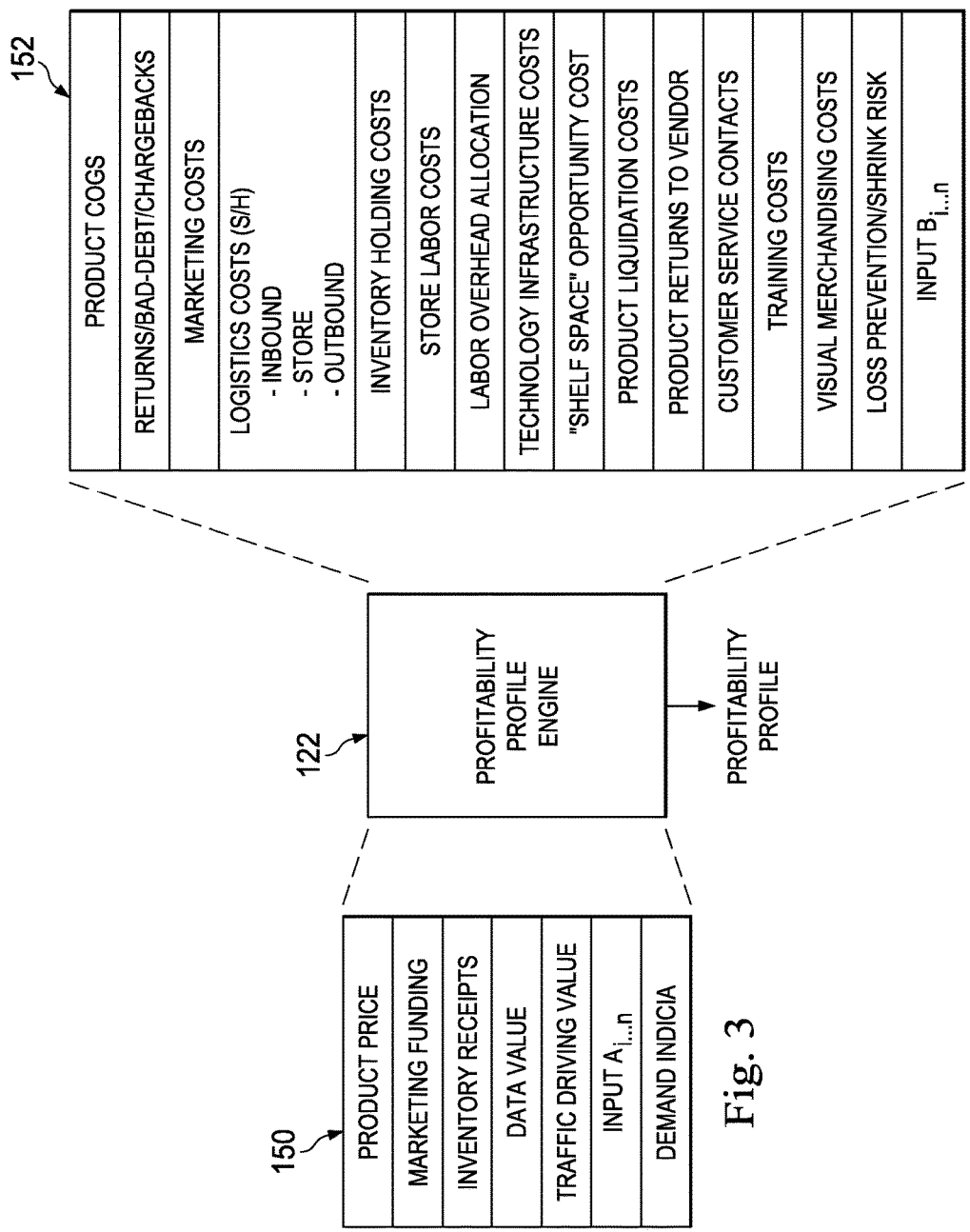
FIG. 3 is an illustration of factors used to determine a profitability profile according to an exemplary aspect of the present disclosure.

FIG. 3 shows an example of factors that may be relied upon by the profitability profile engine 122 to create a product profitability profile for a particular product. In some examples, the selection portal 116 and the commerce engine 118 provide at least some information relating to the factors. The profitability profile engine 122 receives information relating to value increasing factors, referred to here as revenues 150 and receives information relating to value decreasing factors, referred to here as costs 152. The revenues 150 may include one or more revenue generating factors such as, for example, product price, marketing funding, inventory receipts, data value, traffic driving value such as customer interest, demand indicia representing customer interest and third-party information, and other revenue generating inputs. The costs 152 may include, for example, product COGS (cost of goods sold), returns/bad debt/chargebacks, marketing costs, logistics costs (shipping and handling fees for inbound, store, and outbound), inventory holding costs, store labor costs, labor overhead allocation, technology infrastructural costs, shelf space opportunity costs based on product size, product liquidation costs, product returns to vendor, customer service contracts, training costs, visual merchandising costs, loss prevention/shrink risk, and other cost inputs. Taken together, the revenue 150 costs 152 may be factors in a profitability profile value for a particular product that may be an indication of how profitable the particular product is within a particular sales channel. Therefore, the profitability profile may be assigned a value representing the profitability of the product to the merchant. As will be explained below the profitability profile value may be a factor considered by the profitability profile engine 122 in order to identify the most optimal channel for a particular product relative to other products. This in turn, may guide product placement in sales channels to maximize the profitability of particular products depending on the sales channel, shown in and described with reference to FIG. 4 below.

With reference to FIG. 3, the revenues 150 or factors increasing the profitability of a product are explained briefly below. The product price represents the price at which the product is offered for sale to customers. Marketing funding represents funds allocated for particular marketing activities related to the product. Inventory receipts represent value of product maintained in inventory. Data value represents the value derived over a period of time from insight into consumer data, buying habits and trends. Traffic driving value represents customer traffic resulting from product offerings. This may be representative of customer interest as provided through online and in-store searching, browsing, sales, and other factors relating to customer interest. Demand indicia are also based on customer interest in a particular product, as well as third party metrics, which may include, for example only, industry-wide buying habits, search and browsing trends, geographical insights and other consumer metrics. Other factors may also be included when calculating the profitability profile.

The costs 152 or factors decreasing the profitability of a product are explained briefly below. Product costs of goods sold is the price at which the merchant purchased the goods for resale. Returns, bad-debt, and charge backs all include costs incurred when a product is returned to the merchant. Marketing costs represent the costs paid to market the product to customers. Logistics costs represent the shipping and handling costs to the brick and mortar stores or to the customers. Inventory holding costs represent the costs of maintaining product inventory before it is sold to customers. Store labor costs represent the cost for employee salaries in the brick and mortar stores. Labor overhead allocation represents costs due to merchant overhead. Technology infrastructure costs represent costs incurred in developing, implementing, and maintaining the online sites. The shelf space opportunity cost represents the shelf space occupied by one product instead of another. This may take into account the size of the product and the value of alternative products displaced by the product. Product liquidation costs represent the costs of removing the product when it is no longer carried in the product line. Product returns to vendors represent the lost profits when a product is returned by a customer. Customer service contacts represent contracts for customer service including maintenance of products. Training costs represent costs invested in employees to train them to properly use and sell the product. Visual merchandising costs represent the costs of marketing materials, packaging, and other visual merchandising costs. Loss prevention/shrink risk costs represent costs of misplaced or absconded product that is unaccounted for in the stream of commerce. Other factors may also be included when calculating the profitability profile. It is worth noting that as the revenues 150 and costs 152 change, the output profitability profile also changes. Accordingly, in some embodiments the profitability profile engine 122 maintains a real-time or near real-time profitability profile for each product.

Figure 4:
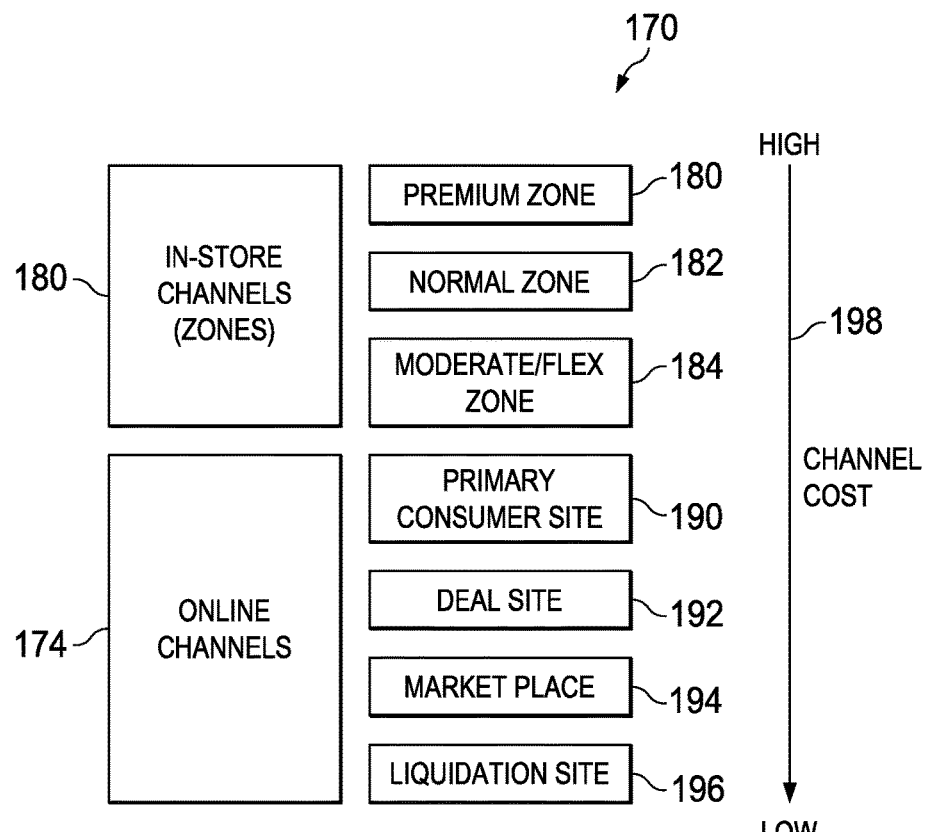
FIG. 4 is a block diagram showing sales channels used to offer for sale products to consumers according to an exemplary aspect of the present disclosure.

FIG. 4 shows a plurality of levels or channels 170 to which a particular product may be assigned for sale to a consumer. Products qualify to be in the various channels based on the product's profitability profile including at least some of the revenues 150 and costs 152 shown in FIG. 3.

In the example shown, the channels 170 fall into two broad categories: instore channels 172 and online channels 174. The instore channels 172 represent actual physical locations within the brick and mortar stores 102 themselves. The instore channels 172 include a premium zone 180, a normal zone 182, and a moderate or flex zone 184. The premium zone 180 includes high visibility in-store locations such as floor displays, locations adjacent the registers, ends of aisles, and other high visibility locations. The normal zone 182 includes standard visibility locations, including for example locations along shelves at eye level, and the moderate or flex zones 184 includes low visibility locations, such as low shelves or high shelves, floor locations, and other less prominent product placement locations.

The profitability profile engine 122, based on the calculated profitability profile value as determined by factors such as those shown in FIG. 3, may assign or may recommend a product be assigned to a particular in-store channel 172. For example, a product having a high profitability profile may be assigned to the premium zone channel 180 of the instore channels 172. Since premium zone channels 180 have limited physical space, a product assigned to the premium zone 180 typically has a high profitability profile, taking into account the factors in FIG. 3. To be maintained within the premium zone channel 180, the product may be required to continue to meet the criteria of the premium zone channel 180. If sales or other factors begin to wane, the profitability profile engine 122 may re-assign the product to a different sales channel.

In a similar manner, the profitability profile engine 122 may assign a product to the normal zone 182. To qualify, the profitability profile engine compares the product profitability profile to the criteria for the normal zone 182. So long as the product profitability profile meets the criteria, the product may be maintained within the normal zone 182. Changes in the profitability profile or other factors may enable the product to move to a higher zone such as the premium zone 180, or to a lower zone, such as the moderate or flex zone 184.

The profitability profile engine 122 may also assign a product to the moderate/flex zone 184. Again, so long as the product profitability profile meets the criteria, the product may be maintained in the moderate/flex zone 184. However, changes in the profitability profile or other factors may cause the profitability profile engine 122 to assign the product to a higher zone such as the normal zone 182 or the premium zone 180, or to a lower zone, which may be found in the online channels 174. Accordingly, if the profitability profile engine 122 determines that the product does not meet the criteria for the moderate/flex zone 184, the profitability profile engine 122 may assign the product to one of the online channels 174, and the product may ultimately be removed from the in-store channels 172. As such, the in-store space occupied by the product may be replaced with a substitute product that has a higher profitability profile. Accordingly, the customer experience is enhanced because the brick and mortar store 102 maintains the most desired or popular products in stock while maintaining the highest level of profitability for the merchant.

It is worth noting that products assigned to instore channels 172 may also be available for purchase online via the online shopping devices 104 (FIG. 1). As such, products assigned to the in-store channels 172 are also available online, and sales and interest from online customers may be factors in determining the product's profitability profile.

The online channels 174 also may contain products that are available for purchase only online, and that are not immediately available in the brick and mortar stores 102. Accordingly, the online channels 174 are accessed via the online shopping devices 104 in FIG. 1. In some embodiments however, some products available for purchase only online may be carried in inventory at the brick and mortar store 102 for pickup or delivery, but may not be allocated space in the brick and mortar showroom. In some embodiments, products available for purchase only online may be shipped or mailed from local, regional, or national distribution locations.

In the example shown, the online channels 174 include a primary consumer site 190, a deal site 192, a market place 194, and a liquidation site 196. The primary consumer site 190 may be, for example, a website on the commerce engine 118 listing all products offered by the merchant. This primary consumer site 190 may include all products distributed through the instore channels 172 and all other products that the merchant offers for purchase. In some embodiments, new products are introduced into the primary consumer site 190. From there, the products may qualify for distribution in the instore channels 172 based on the product's profitability profile value, or may qualify for or be relegated to other online channels based on the product's profitability profile value or product profile.

The deal site 192 in FIG. 4 may be an online channel for products showing particular promise or may be products showing a gradual decrease in profitability profile value. The deal site 192 may be a site arranged to direct particular attention to a product for a short period of time, such as during a holiday, in order to generate a bump in sales or a bump in exposure and consumer interest.

The market place 194 in FIG. 2 may be an online channel that lists products that have a lower profitability profile. The market place 194 may include products being phased out because sales are so low or customer interest is such that the products may be distributed through companion or third party sites.

The liquidation site in FIG. 2 may be used to sell inventory when a product will no longer be carried by the merchant. This may occur, for example, when a manufacturer stops manufacturing products or when a product's profitability profile is so low as to merit stopping distribution. In these cases, for example, the merchant may liquidate all remaining inventory. The liquidation site may sell items that are not allowed to be returned.

The arrow 196 adjacent the channels 170 indicates, for reference only, that each channel has an associated cost. The channel cost for the in-store channels is greater than the channel cost for the online channels. Likewise, the channel cost for the premium zone is greater than the channel cost for the remaining zones. Accordingly, the profitability profile is an indication of how much the merchant should pay to sell the product. As the product's profitability profile value decreases, the investment cost by the merchant also must decrease in order to remain profitable.

In some aspects, products may be offered on multiple online channels 174 in order to provide the best exposure for a particular product in order to generate suitable sales returns. Based on the profitability profile value, the profitability profile engine 122 may make recommendations to offer products in the marketplace 194 and on the primary consumer site 190.

Figure 5:
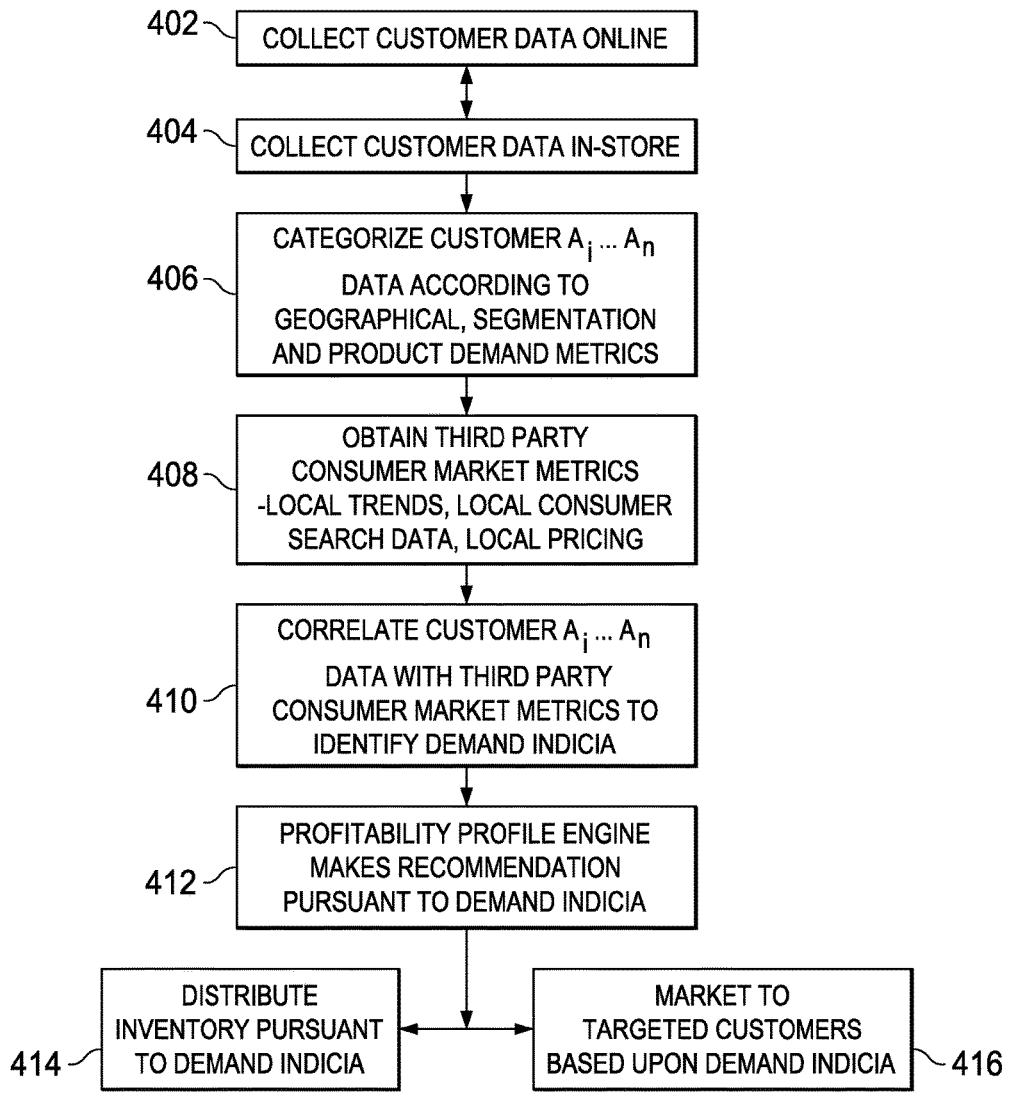
FIG. 5 is a flow chart showing an exemplary method of identifying a sales channel within the sales channels of FIG. 4 according to an exemplary aspect of the present disclosure.

FIG. 5 shows an exemplary marketing flow process of operation for the continuous channel system 100. The process begins at a step 402 where the analytics engine 106 collects information relating to product sales, searches, and online customer data. Online customer data is collected, among other reasons, in order to track customer interest in products as a factor in evaluating profitability profile for a particular product in order to determine the proper sales channel for the product. As indicated above, the online website on the commerce engine 118 may list products carried in the instore channels 172 as well as products carried on the online channels 174. The CICM engine 120 may include information relating to customer shopping histories including information relating to products viewed and products purchased, and other information, and may include contact or other identifying information for a particular customer. During an online shopping experience, the customer information may be supplemented by additional information provided by the customer and/or obtained by the online website. This step is described further with reference to FIG. 6.

Figure 6:
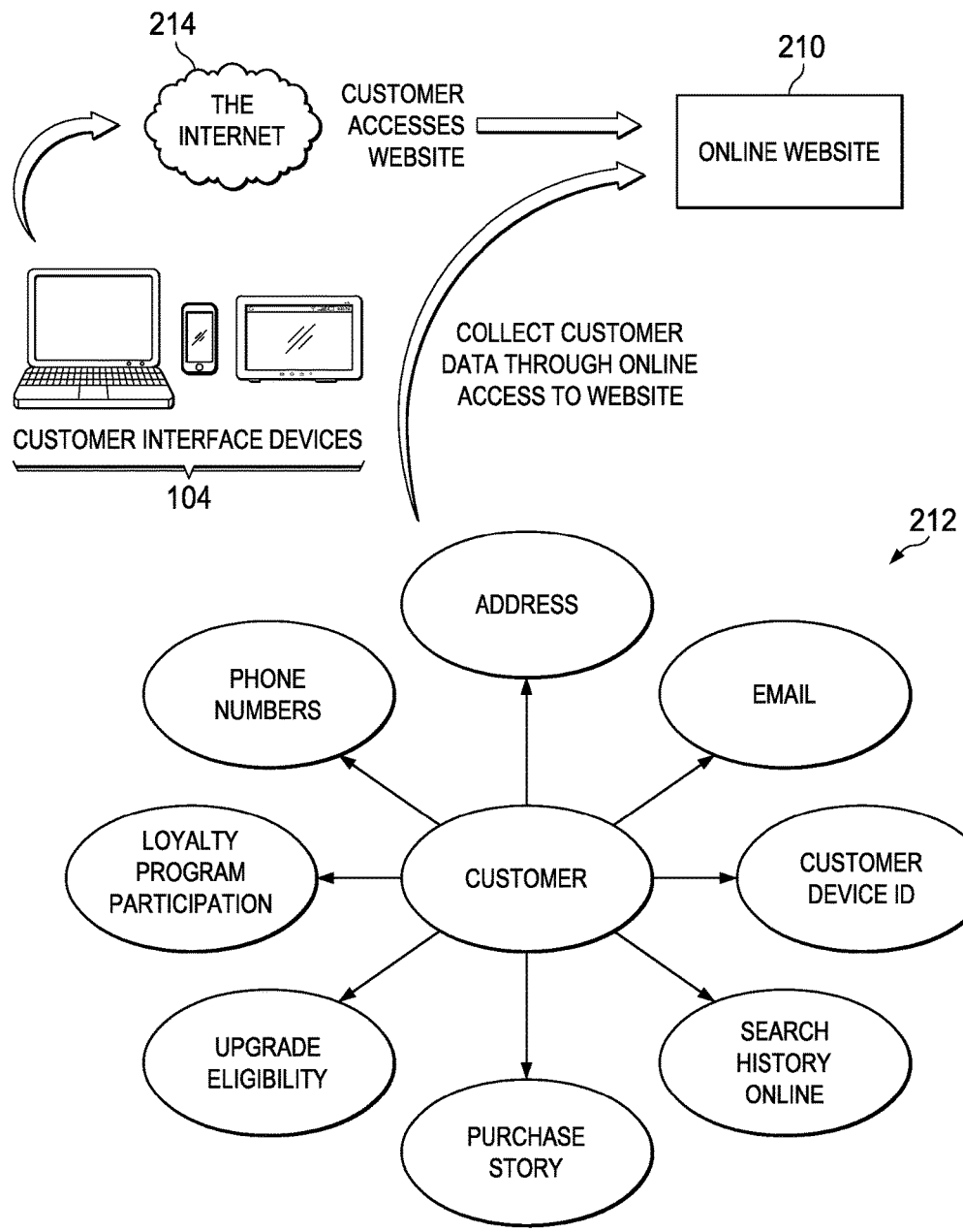
FIG. 6 illustrates collecting online customer data according to an exemplary aspect of the present disclosure.

FIG. 6 illustrates customer data collected through access to an online website 210, such as a merchant website on the commerce engine 118, from which consumers may purchase products offered for sale. The customer data 212 may include any identifying information relating to the particular customer. For example, and as shown in FIG. 6, among other things, the customer data may include phone numbers, address, email, customer device id, online search history, purchase story, upgrade eligibility, loyalty program participation, and other information. This information may be obtained via the commerce engine 118 and stored within the CICM engine 120. It may be accessed to provide information relating to product interests and trends for the specific customer, for all customers, or for groups of customers.

As shown in FIG. 6, the customer may use the online shopping devices 104 or other customer interfacing devices to access the online website 210 over a wide area network, such as the internet 214. As indicated above, the online shopping devices 104 may include any network access device including for example, desktops, laptops, tablets and other mobile computers, or other customer interface devices. These devices may permit customers to view images representing products carried in the online sales channels.

As the customer accesses the online website 210, information regarding the customer may be collected, such as the information 212. Some information may be collected via a login process or may be provided when the customer enrolls in an online loyalty program. Identifying the customer may enable customer recognition to be enabled that may provide for some level of customization to enhance the customer experience and increase overall customer satisfaction. The information may also be obtained by detecting other online interactions. For example, the online website 210 may detect customer interactions by detecting a customer purchase, a customer view or search on the online website 210, enrollment in a loyalty program, registration of a new communication device, such as a smart phone or mobile computer, or other interaction. In some instances, the customer information is stored in the CICM engine 120 and may be accessed by the commerce engine 118 in order to perform a transaction. Additional information relating to the customer may be stored within the CICM engine 120. As described below, this information may be used to identify products, customer interests, and product trends that may affect the profitability profile of a particular product and may help place products within the proper sales channel to provide a suitable return to the merchant on the product.

Returning now to FIG. 5, the flow chart includes collecting customer data in the brick and mortar stores 102 at a step 404. Customer data is collected at the brick and mortar stores 102 in order to track customer interest in products in order to determine the proper sales channel for the product.

Figure 7:
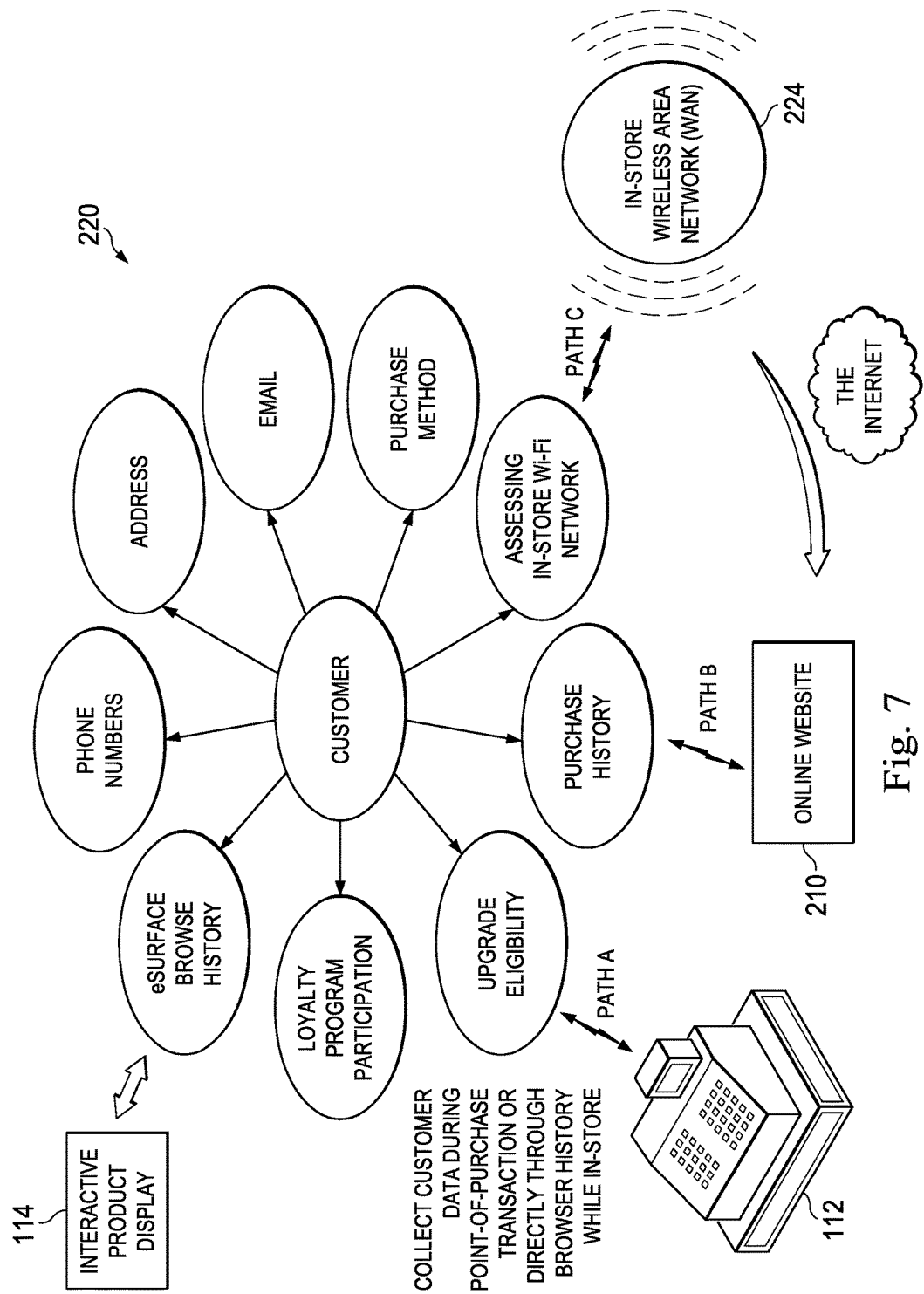
FIG. 7 illustrates collecting customer data from a brick and mortar retail store according to an exemplary aspect of the present disclosure.

FIG. 7 is a chart representing the collection of customer information within a brick and mortar store 102. It shows customer information 220 which may include for example, phone numbers, address, email, purchase method, accessing instore Wi-Fi network, purchase history, product upgrade eligibility, loyalty-program participation, and interactive product display browse history and information. This customer information 220 may be collected in order to identify product trends and customer interests as inputs to the profitability profile engine 122 in order to generate a product value or product profile to assist with placing a product within the proper sales channel (shown in FIG. 4) in order to provide a suitable return to the merchant. Collected customer information 220 may be obtained via the commerce engine 118 and stored in the CICM engine 120 on the analytics engine 106.

FIG. 7 shows brick and mortar store customer information 220 being collected in at least four ways including, for example and without limitation, 1) purchase transaction information, 2) information collected through accessing an in-store wireless network, 3) information captured through the online website 210 accessed from inside the brick and mortar store 102, and 4) information captured via an interactive product display 114 (FIG. 1) maintained within a customer store to provide customers an opportunity to view, browse, learn about, or select products offered for sale in the instore channels and/or the online channels 174. Naturally, information may be obtained via the other methods, including for example, information obtained when a customer enrolls in a reward program or otherwise voluntarily provides information, upgrades his or her devices, purchases warranties, or takes other actions where identifying information may be desirable.

Information collected via a purchase transaction 222 may be used to track, as would be expected, the sales volume, whether customers are amenable to the purchase price, and other information. Additional information may be derived from the purchase transaction including the types of products customers have an interest in. In addition, purchase transaction information may relate to the customer itself, including whether the customer typically pays with cash or credit, among other information relating to the product or the customer.

Information also may be obtained when customers in the brick and mortar store 102 access the store's wireless network 224. Wireless network devices may provide identifying customer information that can be considered or may be relevant when determining a product's profitability profile level. For example, the wireless network 224 may recognize a customer when the customer accesses the wireless network 224 with an access device, such as a handheld smart phone, tablet, or other computer. The wireless network, for example, may be a public Wi-Fi network. The CICM engine 120 may collect information relating to the access device or the customer may build a customer profile. For example, the Wi-Fi network may recognize the number of times the customer enters the store based on the number of times the customer's smart phone, for example, accesses or connects with the wireless network. Later, this customer information may be linked with additional customer information that may be obtained via a purchase transaction, loyalty program enrollment, or other method. This may also be used to provide additional information relating to the customer and the products that the customer finds most interesting. Accordingly, the wireless network information may be indicative of the customer's interest in the products carried within the instore channels 172 or other information.

Customer information may also be obtained when a customer accesses the online website 210 on the commerce engine 118 via the in-store wireless network 224. The customer may connect to the online website from within the brick and mortar store 102 either directly or through a WAN, such as the internet. Accordingly, information relating to products viewed or searched for or accessed by the customer via the instore wireless network may be obtained as an indication of products the customer may be interested in purchasing. Additional information may be collected when the customer makes the purchase directly on the online website 210 over the instore wireless network.

Customer information may also be obtained using the interactive product display 114 in the brick and mortar store 102. For example, the interactive product display 114 may be a user interface display in the brick and mortar store 102 that customers may use to view products, to browse products, or access related websites or online locations with additional information relating to the products. In some aspects, for example, the interactive product display 114, may display a menu of products selectable to access additional information about the product. In some aspects, the interactive product display 114 may alternatively display a plurality of products that may be selected for additional information. In some aspects, interactive product display 114 may be a touch screen interface system configured to display products for sale in one or more of the sales channels 170 to customers that browse the brick and mortar store. Information relating to the customer's interest in a product may be obtained when a customer selects, searches for, or otherwise provides information that may be indicative of customer interest. In some embodiments, the interactive product display 114 may display a stock keeping unit (SKU)

that may direct customer access devices, such as smart phones, to products on the online website 210. For example, the customer may use a smart phone as an interface device to take a picture of the SKU or code which, in turn, may direct the customer to the online website for additional information about the product. Loyalty program participation also provides customer information. For example, customers enrolled in a loyalty program may receive discounts or other incentives by providing additional customer information that enables the continuous channel system to identify products of interest.

Returning now to FIG. 5, after the customer online data is collected at step 402 and the customer in-store data is collected at step 404, the continuous channel system 100 may categorize the customer data according to geographical, segmentation, and product demand metrics at a step 406.

Categorizing customer data at step 406 into geographical categories may include identifying a location or region within which the product may be offered. In some examples, certain products may be purchased with higher regularity in some regions than in other regions. Categorizing customer data according to different segments also may provide product information enabling product placement in the most desirable channel. This may include for example, categorizing groups of customers falling within particular categories such as age, gender, income, education, interests, among others.

Product demand metrics may include information indicating the types of products customers, taken together as a whole, are interested in. They may also include metrics indicating the product popularity by segment, locale, or region. For example, each segment of customers or each locale or region of customers may have different product demands. The product demand metrics may include, for example only, product information such as sales, online searches, or hits on the online website 210. They may also include information obtained by online or in-store searching, browsing, or other information.

At a step 408 in FIG. 5, the analytics engine 106 of continuous channel system 100 may obtain third-party consumer market metrics. The third-party consumer market metrics may include, for example, local trends, local consumer search data, local pricing, and other factors that may be used to indicate or identify customer interest in products offered for sale. In some aspects, the third-party consumer market metrics may be licensed or obtained from third-party marketing firms or organizations that collect information relating to products and customers. This information may then be input into the analytics engine 106 and may be used as one or more factors relied upon to calculate the profitability profile level for a particular product. In some aspects, the third-party consumer market metrics may include information related to competitor pricing, marketing, sales, or other factors that may be used to indicate which sales channel 170 a product should be placed in.

At a step 410, the continuous channel system 100 may correlate the online customer information 212, the brick and mortar store customer information 220, and the third party consumer market metrics to identify demand indicia. Demand indicia, based upon all the collected information, may be one or more factors used as inputs to identify the profitability profile. It may represent, like the profitability profile for a particular product, a profile of demand relating to a particular product. The demand indicia may provide an indication of how profitable a product may be independent of its sales channel, and the indicia may be used as an input to the profitability profile to determine the ideal particular sales channel for a particular product.

At a step 412, the profitability profile engine 122 receives the demand indicia, and along with information indicative of other factors relating to a particular product, outputs a profitability profile level or product value pursuant to the demand indicia, as indicated with reference to FIG. 3. Based upon the profitability profile level, the profitability profile engine 122 may recommend one or more particular sales channels 170, including the instore channels 172 as well as the online channels 174, for distribution of the product. Accordingly, based on the demand indicia determined by the customer data and the third party consumer market metrics, as well as additional factors identified with reference to FIG. 3, the analytics engine 106 outputs a recommendation to distribute a product through an online channel 174 or within an instore channel 172.

At a step 414, inventory may be distributed pursuant to the demand indicia based on the recommendation of the profitability profile engine 122. The distributed inventory may, for example, be sent for distribution in brick and mortar stores 102, with instructions to place the products in, for example, the premium zone 180, the normal zone 182, or the moderate of flex zone 184. In some aspects, the inventory may be distributed to a local clearing house within a particular region. In some aspects, the inventory may be distributed to storage rooms for individual brick and mortar stores so that customers can choose an instore pickup without the product being on display in the showroom in the brick and mortar store 102. The inventory may be distributed in a manner that provides a cost effective return for each of the products sold based on the profitability profile value.

In addition, at a step 416, marketing to targeted customers may be done based upon the recommendations of the profitability profile engine 122. In some examples, marketing to targeted customers may include sending incentives or advertisements relating to categories of related products that the customers may be interested in, based upon the customer information in the CICM engine 120. The marketing to targeted customers may include marketing to customers within a particular geographical region, within a particular segment, or marketing to individual customers. This may include sending incentives such as coupons or ads to customers that fall within a particular segment or geographical region. In some aspects, the profitability profile engine 122 may recommend marketing based on customer interest and customer information obtained relating to customer interests. These may be directed to, for example, to a personal user or to a customer interface device of a personal user such as a smartphone or other personal communication device.

Figure 8:
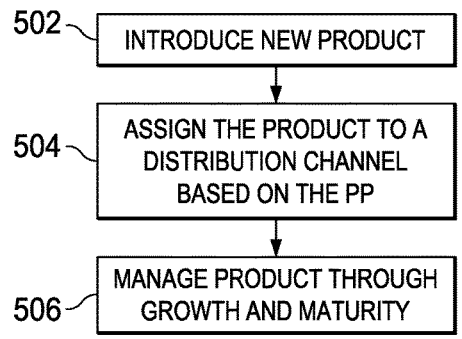
FIG. 8 is a flow chart illustrating an exemplary method of managing product through the channels of FIG. 4 according to an exemplary aspect of the present disclosure.

FIG. 8 shows a method utilizing customer information including online customer information 212 and brick and mortar customer information 220 to place product within one or more of the sales channels 170. FIG. 8 begins at a step 502 of introducing a new product into a product line including a plurality of sales channels 170. Step 502 is described more fully with reference to FIG. 9.

Figure 9:
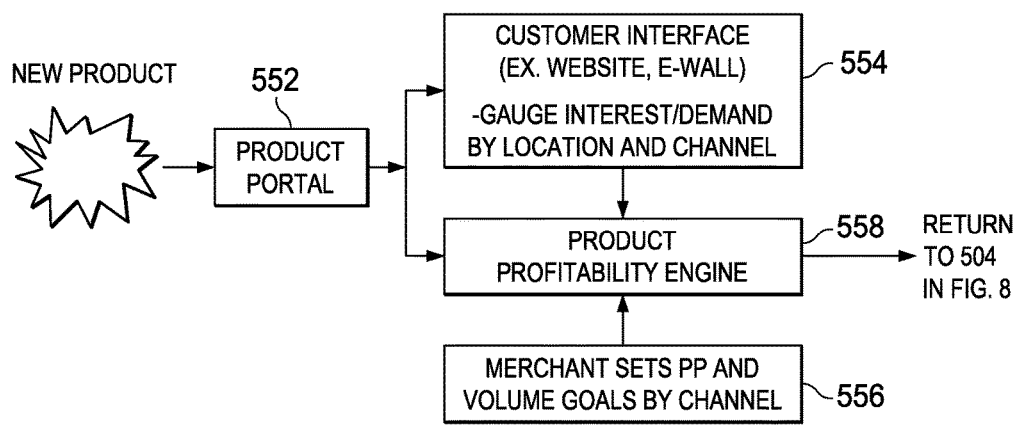
FIG. 9 is a flow chart showing an exemplary method for introducing new products and assigning the new products to a sales channel according to an exemplary aspect of the present disclosure.

FIG. 9 is a flow chart that shows a process 550 of introducing a new product into the analytics engine 106 in order to identify the most suitable sales channels for the product. In this example, information relating to the product may be introduced via the selection portal 116 (FIGS. 1 and 2) to the analytics engine 106 at a step 552. The selection portal 116 may be accessed by, and the product information may be input by, a merchant, a vendor, or other distributor with a product to introduce to the analytics engine 106. Information relating to the product that may be input to the selection portal may include, among other information, product identifiers, bi-directional supplier tools, pricing, cost of goods sold, space requirements, shipping weights, estimated time to sale, similar SKUs, MDF, expected volume, return and sales information, customer service information, and other factors relating to the product and expectations.

At a step 554, information relating to the product may be displayed to potential customers on a customer interface. The customer interface may include, for example, screen displays of the online website 210 on the online shopping devices 104 or on the data collection systems 110, such as the interactive product display 114 in a brick and mortar store 102. Information obtained by displaying the product to customers may be used to gauge interest and demand in the product.

At a step 556, additional information related to expectations and goals of the product may be input by the merchant. In one embodiment, only the merchant inputs the information relating to expectations and goals for product sales. In other embodiments, the merchant, as well as vendors selling product on the merchant's site may input information relating to expectations and goals for product sales. In some embodiments, input information includes profitability profile information and may include volume goals, with one or more goals made for each of the channels 170. Accordingly, later as the product is marketed and sold through a particular sales channel, the expectations for the product to remain in the particular channel are preset.

At a step 558, the information relating to product from the selection portal, the information relating to the customer interface, and the goals and profitability profile related information are input into a profitability profile engine 122 at a step 558. The method then returns to step 504 in FIG. 8.

Returning to FIG. 8, at the step 504, the profitability profile engine 122 outputs a profitability profile value for the particular product. The profitability profile engine 122 processes the information and outputs a recommended sales channel 170 for the particular product, based on the inputs. The profitability profile engine 122 may take into account any part of or all the information used to determine the profitability profile in FIG. 3. Accordingly, based on the information input into the profitability profile engine 122, the profitability profile engine 122 may output a profitability profile value and/or recommendation to distribute the product in one of the in-store channels 172 or the online channels 174. It may also recommend a particular zone in the in-store channels 172 or online channels 174. For example, if the product has a high profitability profile, the profitability profile engine may recommend that the product be placed in the premium zone 180. If the profitability profile level is below the premium zone, the profitability profile engine 122 may recommend that the product be placed in the normal zone 182 or the moderate/flex zone 184. If the profitability profile level is below that required to be placed in the in-store channels 172, the profitability profile engine may recommend that the product be placed within the online channels. Again, depending on the profitability profile level, the profitability profile engine may recommend that the product be placed on the primary consumer site, 190, the deal site 192, the market place 194, and the liquidation site 196.

The profitability profile engine 122 also develops a forecast based in part on the assigned sales channel 170, and based on the forecast, may generate product purchase orders and may control inventory allocation by channel 170, whether instore channels 172 or online channels 174. In one example, the inventory allocation may include each of the in-store channels 172 and each of the online channels 174 suitable for the particular product. Based on the profitability profile as determined by the profitability profile engine 122, the profitability profile engine may identify the ideal location for the particular product in the in-store channels or zones as shown in FIG. 3.

Figure 10:
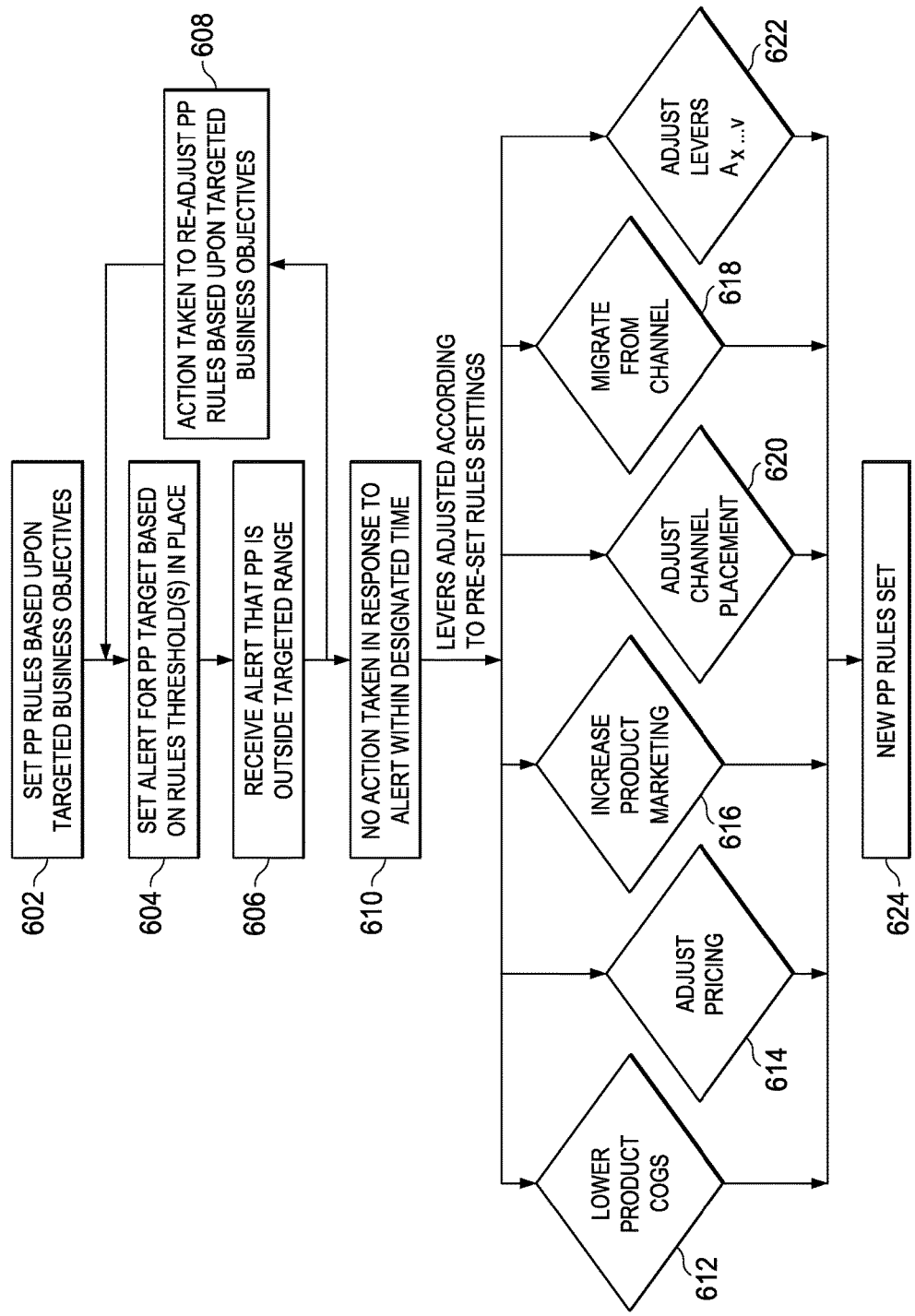
FIG. 10 is a flow chart illustrating an exemplary method of managing products through sales channels according to an exemplary aspect of the present disclosure.

At a step 506 in FIG. 8, the product is managed through growth and maturity. Since the customer interest, pricing structures, and other information relating to the product can change over time, the profitability profile, which is based in part on these dynamic figures also changes over time. Managing the product through growth and maturity is intended to maintain control over the product by maintaining it within a channel that is best suited to the particular product. This is described further with reference to the flow chart in FIG. 10. FIG. 10 shows a process for treating a product after it is assigned to a particular channel 170.

FIG. 10 shows a flow chart for managing product through growth and maturity. It includes modifying sales channels or taking other action to maximize profitability or exposure for a particular profit or to begin to transition the product out of the product line, for example.

The chart in FIG. 10 begins by accounting for the product within its pre-established sales channel. The profitability profile engine 122 may continue to monitor the revenues 150 and costs 152 set forth in FIG. 3, including customer interest as represented by product pricing, receipts, traffic driving value, products costs, space requirements, customer reviews, marketing factors, inventory health, costs of goods sold, logistics, and all other factors set forth in FIG. 3 to rate or gauge and determine whether the product is within expectation, above expectation or below expectation. Accordingly, for each individual product, profitability profile value rules may be established based upon targeted business objectives as indicated at step 602. The rules may vary depending on the assigned sales channel. For example, a product within one sales channel may have a different set of profitability profile value rules than a product within a different sales channel. The rules, also referred to as criteria, may be pre-stored and may represent a value or include specific criteria that must be met for the product to be maintained within the particular sales channel.

At a step 604, the profitability profile engine 122 sets an alert for the target profitability profile value based on the profitability profile value rules established in step 602. As long as the product performs within the designated rules, the product will be maintained within its expected sales channel. However, if the product does not conform to the profitability profile value rules, the continuous channel system 100 may generate an alert that the profitability profile value is outside the targeted range at a step 606. An alert may be received at the product vendor or at the merchant and may indicate to the vendor or merchant that the product is either exceeding expectations or not meeting expectations, based on the real time profitability profile value.

At a step 608, a vendor or merchant may choose an action to adjust the profitability profile level rules based upon different targeted business objectives. This may include, for example, modifying the inputs used to calculate the profitability profile level set forth in FIG. 3. For example, the vendor may take actions including adjusting the product price, increasing marketing funding, changing the costs of goods sold, and taking other actions. In response to modifying factors affecting the profitability profile level, the method may return to step 604, where the target profitability profile values are maintained in place.

At a step 610, a vendor or merchant may choose to take no action in response to an alert that the profitability profile value is outside the targeted range. As such, the profitability profile engine 122 may adjust any of a number of different metrics according to the preset rules of the system 100. Exemplary metrics that may be adjusted are set forth in steps 612-620. For example, at step 612, the profitability profile engine 122 may lower the product cost of goods sold. In some embodiments, this may include notifying the vendor that the current costs of the product decrease the value of the product and that the costs must be decreased to a specific price or by a specific amount in order for the product to be maintained within its currently assigned sales channel 170.

At a step 614, the profitability profile engine 122 may adjust the product price. This may include either increasing the product price or decreasing the product price to drive an increase in sales or profit.

At step 616, the profitability profile engine 122 may recommend an increase in product marketing. For example, if sales are generating high levels of customer interest, as indicated by the customer information or if the profitability profile value is higher than expected, additional product marketing may help further increase popularity and sales. This may include advertising to all potential customers, or may include more targeted advertising sent to particular customers that fall within a particular region or population segment. In some instances, the advertising may be to particular individuals and advertisements or incentives or discounts may be sent to particular online shopping devices or to particular customers.

At a step 618, the profitability profile engine 122 may recommend a channel migration. As described above, the profitability profile engine 122 may recommend that a product move up or down along the channel continuum in FIG. 3 based upon the current profitability profile level of the product. For example, if the profitability profile level exceeds expectations, the profitability profile engine 122 may recommend that the product be moved to a higher channel with increased customer exposure. For example, if the profitability profile value of a product within the moderate/flex zone 184 increases to a level beyond the rules threshold, the profitability profile engine 122 may recommend that the product be relocated within the brick and mortar store to the normal zone 182. Likewise, if the product is in the normal zone 182 and the product profitability profile value exceeds the rules threshold, the profitability profile engine 122 may recommend the product be moved to the premium zone 180. If the product is sold through only online channels, an increase in profitability profile may result in a recommendation to move the product into the moderate/flex zone 184 in a brick and mortar store 102. This may be repeated for any of the channels shown in FIG. 4.

In a similar manner, if the product is performing below the target business objectives, and the profitability profile level is below the desired threshold, then the profitability profile engine 122 may recommend moving down one channel. For example from the premium zone 180 to the normal zone 182, or from the normal zone 182 to the moderate/flex zone 184, or from the moderate/flex zone 184 out of the in-store channels to the primary consumer site 190, and from the primary consumer site to the deal site 192, and so on.

At a step 620, as an alternative to a channel migration, the profitability profile engine 122 may recommend an adjustment in the channel placement. In some embodiments, each of the in-store channels may include a plurality of subzones, with each subzone having a different expectation associated with them, in that the subzones create a continuum with some subzones being higher profile than others. As such, the profitability profile engine 122 may recommend an adjustment in channel placement from one subzone to another within the same sales channel.

At a step 622, the profitability profile engine 122 may adjust one or more additional factors that may affect the profitability profile value. These factors are referenced here as levers because they may be increased or decreased to achieve the desired profitability profile value. Any of the factors in FIG. 3 may be adjusted to achieve the desired outcome.

At step 624, the analytics engine 106 may establish new profitability profile rules based on the adjusted factors. In some embodiments, the analytics engine 106 maintains the same rules for the product as it continues to be sold in the same sales channel but with a modified profitability profile. In some embodiments, new rules are created only when the product migrates from one channel to another at step 618.

Figure 11:
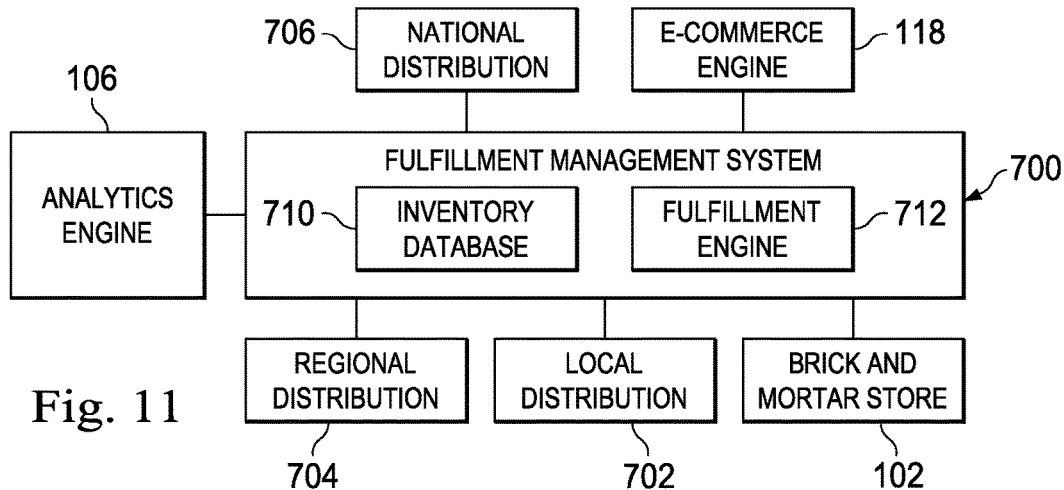
FIG. 11 is a block diagram illustrating an exemplary fulfillment management system according to an exemplary aspect of the present disclosure.

FIG. 11 shows an exemplary diagram representing a fulfillment management system 700 that may be associated with the analytics engine 106 to present shipping and delivery options to a customer purchasing a product, and to direct shipping to the customer. In some embodiments, the shipping and delivery options may be presented to a customer located outside a brick and mortar store, such as to an online customer, for example. In other embodiments, the shipping and delivery options may be presented to a customer making an in-person purchase at a brick and mortar store when either the brick and mortar is out of the product inventory or when the customer desires to have the product shipped or delivered to separate location.

As can be seen in FIG. 11, the fulfillment management system 700 is in communication with the brick and mortar stores 102, local product distribution locations 702, regional distribution locations 704, and/or national distribution locations 706.

The fulfillment management system 700 includes an inventory database 710 and a fulfillment engine 712. The inventory database 710 stores inventory of each product carried in each of the brick and mortar stores 102, local product distribution locations 702, regional distribution locations 704, and/or national distribution locations 706. It also stores the address or physical location of each store or distribution location 102, 702, 704, 706. The inventory database 710 may be accessed by the analytics engine 106, and by authorized customer service representatives (whether located in the stores or distributions location 102, 702, 704, 706), by call centers, or other locations, to check inventory and to identify the location of a desired product.

The inventory database 710 communicates with each store or distribution location 102, 702, 704, 706, and is updated in real-time to provide reliable inventory allocation and shipping information for each product purchased. For example, when a customer purchases and leaves with a product from a brick and mortar store, the brick and mortar store accesses and updates the inventory database 710 to indicate the change in inventory. Similarly, if the customer purchases a product for delivery, the delivering location is updated to indicate the change in inventory. By updating the inventory in real-time, the chance of a single product item being allocated to more than one customer is prevented or limited.

The customer making a purchase of a product may be presented with multiple selectable fulfillment options in response to his or her order. The fulfillment options may include, among other options, delivery to a residence, delivery to a business, one-hour delivery, two-hour delivery, same-day delivery, next-day delivery, two-day delivery, 3-5 day delivery, or other delivery option. The availability of shipping options is dependent on the delivery address provided by the customer and the location of available product as indicated in the inventory database. Accordingly, before shipping options are presented to the customer, the commerce engine 118 or brick and mortar store 102 accesses the fulfillment engine 702 and provides information relating to delivery location and the product being ordered. The fulfillment engine 712 accesses the inventory database 710 to determine the location of product. It may then compare the product location to the delivery address and determine the options for delivery based on proximity and delivery capacity. For example, the delivery capacity may include tracking of delivery driver availability.

Figure 12:
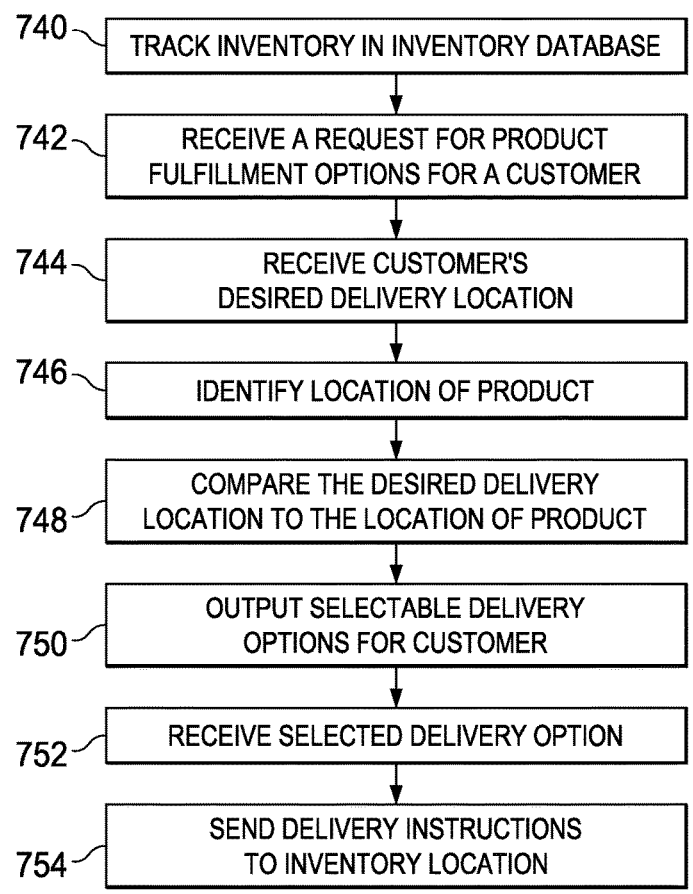
FIG. 12 is a flow chart illustrating an exemplary method of managing product fulfillment to a customer according to an exemplary aspect of the present disclosure.

An exemplary method of using the fulfillment management 700 is described below. In reference to FIG. 12, at a step 740 product inventory is tracked in the inventory database for the brick and mortar stores 102, local product distribution locations 702, regional distribution locations 704, and/or national distribution locations 706. At a step 742, the system receives a request for product fulfillment options for a customer making a purchase. The request may be generated by the commerce engine 118, by a brick or mortar store 102, or by a customer service representative located at a separate location, such as, for example, a call center or one of the product distribution locations 702, 704, 706.

At a step 744, the fulfillment management system 700 receives a customer's desired delivery location. In some embodiments, the request at step 742 includes the customer's desired delivery location as an address. In other embodiments, the request identifies the customer and the fulfillment management system 700 accesses location information on the analytics engine 106, such as in the CICM engine 120 (FIG. 2).

With the delivery address known, the fulfillment engine 712 accesses or communicates with the inventory database 710 to identify the location of the ordered product, at a step 746. The inventory database 710 may communicate all the locations where the ordered product is located, including local brick and mortar stores 102 and including one or more distribution centers 702, 704, 706.

At a step 748, the fulfillment engine 712 compares the desired delivery location with the location of the inventory to determine the available delivery options for the customer. For example, if the delivery location is far removed from a brick and mortar store or distribution location, then one-hour delivery will not be presented as a selectable option. Instead, the options may include, for example, next-day delivery, two-day delivery, or longer delivery as shipment may be made from regional or national distribution locations. Likewise, if the delivery location is within a preset distance from an inventory location or meets other preset criteria, the fulfillment engine 712 may determine that one-hour delivery, two-hour delivery, or other delivery is feasible, along with the standard next-day delivery, two-day delivery, or longer delivery.

Based on this comparison, at step 750, the fulfillment engine 712 outputs a plurality of selectable delivery options to the requesting brick and mortar store, commerce engine, or other customer service representative for presentation to the customer. The output may also include delivery cost information for each delivery option. These may be based on customer type (e.g., business or residence) and based on feasibility. The customer may then request the desired delivery option.

At a step 752, the fulfillment engine 712 receives the selected delivery option from the requesting brick and mortar store, commerce engine, or other customer service representative. Based on the selection, the fulfillment management system 700 arranges for delivery from the relevant product location to the customer's desired delivery address. The inventory database 710 may then be updated to indicate the change in inventory and to allocate the product to the customer so that it won't be resold to another customer before being delivered.

At a step 754, the fulfillment management system 700 sends instructions for delivery to the inventory location so that the product may be shipped or delivered. In instances where the delivery is to be made from a brick and mortar store or local distribution point, rather than through delivery service such as, for example, U.S. Mail, Federal Express, or United Parcel Service, the fulfillment management system 700 may provide delivery instructions to the delivering location, whether the location is a brick and mortar store or a local distribution point.

Some embodiments also consider the status of the customer, taking into account whether the customer has an elevated status based on the loyalty program discussed herein. For example, customers meeting criteria may receive different delivery options than other customers. For example customers meeting specific customer criteria may be presented with delivery options that are not presented to customers that fail to meet the same specific criteria.

In an exemplary aspect, the present disclosure is directed to a method for determining a sales channel for a product in a brick and mortar store. The method may include displaying to customers in a brick and mortar store information on an interactive data collection system relating to a product; collecting, via the data collection system, information indicative of customer interest in the product by tracking inputs at the interactive data collection system; collecting, via an online website, information indicative of customer interest relating to the product; and based upon both the information obtained at the brick and mortar store and the information obtained by the online website, determining a sales channel from a plurality of channels to offer the product for purchase by a customer.

In an aspect, the method may include collecting information relating to customer interest in the product by tracking connections made by customer devices in the brick and mortar store to a wireless network in the brick and mortar store. In an aspect, tracking inputs at the interactive data collection system comprises: tracking the number of searches relating to the product and tracking the number of views of the product. In an aspect, the method may include displaying a SKU on the interactive data collection system and tracking the number of views of the product at the online website attributable to customers accessing the SKU. In an aspect, the method may include receiving information indicative of customer interest from a plurality of interactive data collection systems respectively disposed in a plurality of brick and mortar stores; segmenting the information into information obtained from first and second geographical regions; and determining a first sales channel to offer the product for purchase by a customer in the first region; and determining a second sales channel different from the first sales channel to offer the product for purchase by a customer in the second region. In an aspect, the method may include calculating a product profitability profile indicative of profitability for the product based at least in part on both the information obtained at the brick and mortar store and the information obtained by the online website; based on the calculated product profitability profile, determining that the product is more profitable in a second sales channel different from the first sales channel; and offering the product for sale to a customer in the second sales channel and removing the product from the first sales channel. In an aspect, the plurality of channels comprises a plurality of in-store channels and a plurality of online channels, and wherein determining a sales channel from a plurality of channels to offer the product for purchase by a customer comprises selecting one of the plurality of in-store channels when the customer interest is relatively higher and selecting one of the plurality of online channels when the customer interest is relatively lower. In an aspect, the plurality of in-store channels comprises: a first channel including areas within the brick and mortar store having a higher visibility to customers; and a second channel including areas within the brick and mortar store having a lower visibility to customers, wherein determining a sales channel from a plurality of channels includes determining whether to offer the product for purchase in the first channel or the second channel based on both the information obtained at the brick and mortar store and the information obtained by the online website. In an aspect, the interactive data collection system comprises a touch screen display disposed within the brick and mortar store accessible to customers. In an aspect, the method may include collecting third party metrics indicative of customer interest relating to the product; and determining the sales channel from the plurality of channels to offer the product for purchase by a customer based in part on the third party metrics.

In an exemplary aspect, the present disclosure is directed to a system for determining a sales channel for a product in a brick and mortar store. The system may include an interactive data collection system on display to customers in a brick and mortar store, the interactive data collection system displaying information relating to a product. The system also may include a customer insight and competitive management (CICM) engine configured to collect, via the data collection system, information indicative of customer interest in the product by tracking inputs at the interactive data collection system, the CICM engine also being configured to collect information from an online website indicative of customer interest relating to the product. The system may also include a profitability profile engine configured to receive the information indicative of customer information from the data collection system and determine a sales channel from a plurality of channels to offer the product for purchase by a customer.

In an aspect, the exemplary system may include a wireless network in the brick and mortar store, the wireless network collecting information relating to customer interest in the product by tracking connections made by customer devices in the brick and mortar store. In an aspect, the CICM engine is configured to track inputs at the interactive data collection system by tracking the number of searches relating to the product and tracking the number of views of the product. In an aspect, the interactive data collection system is configured to display a SKU, wherein the CICM engine is configured to track the number of views of the product at the online website attributable to customers accessing the SKU. In an aspect, the exemplary system may include a plurality of interactive data collection systems respectively disposed in a plurality of brick and mortar stores, wherein the CICM engine is configured to segment information from the plurality of interactive data collection systems into information obtained from brick and mortar stores in first and second geographical regions; and an analytics engine configured to determine a first sales channel to offer the product for purchase by a customer in the first region; and configured to determine a second sales channel different from the first sales channel to offer the product for purchase by a customer in the second region. In an aspect, the exemplary system may include an analytics engine configured to calculate a product profitability profile indicative of profitability for the product based at least in part on both the information obtained at the brick and mortar store and the information obtained by the online website, wherein the analytics engine is configured to, based on the calculated product profitability profile, determine that the product is more profitable in a second sales channel different from the first sales channel; and wherein the analytics engine is configured to recommend offering the product for sale to a customer in the second sales channel and removing the product from the first sales channel. In an aspect, the plurality of channels comprises a plurality of in-store channels and a plurality of online channels, the system comprising: an analytics engine configured to determine a sales channel from a plurality of channels to offer the product for purchase by a customer, the analytics engine being configured to select one of the plurality of in-store channels when the customer interest is relatively higher and being configured to select one of the plurality of online channels when the customer interest is relatively lower. In an aspect, the plurality of in-store channels comprises: a first channel including areas within the brick and mortar store having a higher visibility to customers; and a second channel including areas within the brick and mortar store having a lower visibility to customers, wherein the analytics engine is configured to determine whether to offer the product for purchase in the first channel or the second channel based on both the information obtained at the brick and mortar store and the information obtained by the online website. In an aspect, the interactive data collection system comprises a touch screen display disposed within the brick and mortar store accessible to customers. In an aspect, the exemplary system may include an engine configured to collect third party metrics indicative of customer interest relating to the product and configured to determine the sales channel from the plurality of channels to offer the product for purchase by a customer based in part on the third party metrics.

In another exemplary aspect, the present disclosure is directed to a method for determining a sales channel for a product in a brick and mortar store. The method may include collecting information indicative of customer interest in a product by tracking searches made through a wireless network in the brick and mortar store; collecting, via an online website, information indicative of customer interest relating to the product; and based upon both the information obtained at the brick and mortar store and the information obtained by the online website, determining a sales channel from a plurality of channels to offer the product for purchase by a customer. In an aspect, the method may include displaying to customers in a brick and mortar store information on an interactive data collection system relating to a product; collecting, via the data collection system, information indicative of customer interest in the product by tracking inputs at the interactive data collection system; and based upon the information obtained at the data collection system, determining a sales channel from a plurality of channels to offer the product for purchase by a customer.

In an aspect, tracking inputs at the interactive data collection system comprises: tracking the number of searches relating to the product and tracking the number of views of the product. In an aspect, the method may include displaying a SKU on the interactive data collection system and tracking the number of views of the product at the online website attributable to customers accessing the SKU. In an aspect, the method may include receiving information indicative of customer interest from a plurality of interactive data collection systems respectively disposed in a plurality of brick and mortar stores; segmenting the information into information obtained from first and second geographical regions; and determining a first sales channel to offer the product for purchase by a customer in the first region; and determining a second sales channel different from the first sales channel to offer the product for purchase by a customer in the second region.

Persons of ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

We claim:

1. A method for determining a sales channel for a product in a brick and mortar store, the method comprising:
   receiving, at data processing hardware, a selection input from a customer using an interactive data collection system display in communication with the data processing hardware, the interactive data collection system display located in a brick and mortar store;
   determining, by the data processing hardware, that the selection input corresponds to a first indicia of customer interest for a product;
   receiving, at the data processing hardware, online website information corresponding to online indicia of customer interest relating to the product, the online website information obtained from a customer device input via an online website offering the product;
   receiving, at the data processing hardware, a wireless network connection request from a portable wireless device requesting access to a wireless network of the brick and mortar store, the portable wireless device corresponding to the customer and configured to send the wireless network connection request upon entering the brick and mortar store;
   determining, by the data processing hardware, that the wireless network connection request corresponds to a second indicia of customer interest for the product;
   determining, by the data processing hardware, a product profitability profile based on the first indicia, the second indicia, and the online indicia, the product profitability profile comprising a sales channel identifying where to offer the product;
   determining, by the data processing hardware, whether an actual product profitability for the product satisfies a sales channel threshold for the product, the actual product profitability corresponding to revenue generated by the product, the sales channel threshold indicating an acceptable profit for the product within the sales channel and input from an administrative device associated with an entity that owns the brick and mortar store; and
   when the actual product profitability satisfies the sales channel threshold, transmitting, from the data processing hardware, a profitability profile alert to the administrative device, the profitability profile alert when received by the administrative device causes the administrative device to display instructions on a display in communication with the administrative device, the display instructions indicating product management options, the product management options configured to:
   adjust a price related to the product;
   recommend an increase in marketing related to the product; or
   determine a new sales channel for the product, the new sales channel replacing the sales channel of the product profitability profile.

2. The method of claim 1, further comprising determining, by the data processing hardware, that the wireless network connection request corresponds to a customer profile with additional customer information, the additional customer information comprising at least one of a purchase transaction history, loyalty program information, or a wireless network connection request history.

3. The method of claim 1, wherein the selection input at the interactive data collection system comprises at least one of a search input relating to the product or a viewing selection of the product.

4. The method of claim 1, wherein the selection input corresponds to the customer accessing a stock keeping unit (SKU) of the product on the interactive data collection system.

5. The method of claim 1, further comprising:
   segmenting, by the data processing hardware, each indicia of the first indicia, the second indicia, and the online indicia into a first geographic region and a second geographic region based on a location where each indicia was obtained; and
   determining, by the data processing hardware for the product profitability profile, a first sales channel to offer the product in the first geographic region and a second sales channel to offer the product for purchase in the second geographic region, the first sales channel different from the second sales channel.

6. The method of claim 5, further comprising:
   determining, by the data processing hardware, that the actual product profitability of the second sales channel is more profitable than the first sales channel; and
   offering, by the data processing hardware, the product for sale in the second sales channel and removing the product from the first sales channel.

7. The method of claim 1, wherein the sales channel of the product profitability profile is selected from a plurality of channels comprising a plurality of in-store channels and a plurality of online channels, the in-store channels corresponding to a greater degree of customer interest than the online channels.

8. The method of claim 7, wherein the plurality of in-store channels comprises:
   a first channel corresponding to high visibility areas for customers within the brick and mortar store; and
   a second channel corresponding to low visibility areas for customers within the brick and mortar store.

9. The method of claim 1, wherein the interactive data collection system comprises a touch screen display disposed within the brick and mortar store accessible to customers.

10. The method of claim 1, further comprising:
   receiving, at the data processing hardware, third party indicia indicative of customer interest relating to the product, the third party indicia corresponding to third party metrics for customer interest; and determining, by the data processing hardware, the product profitability profile based on the first indicia, the second indicia, the online indicia, and the third party indicia.

11. A system for determining a sales channel for a product in a brick and mortar store, the system comprising:
data processing hardware; and
memory hardware in communication with the data processing hardware, the memory hardware storing instructions that when executed on the data processing hardware cause the data processing hardware to perform operations comprising:
receiving a selection input from a customer using an interactive data collection system display in communication with the data processing hardware, the interactive data collection system display located in a brick and mortar store;
determining that the selection input corresponds to a first indicia of customer interest for a product;
receiving online website information corresponding to online indicia of customer interest relating to the product, the online website information obtained from a customer device input via an online website offering the product;
receiving a wireless network connection request from a portable wireless device requesting access to a wireless network of the brick and mortar store, the portable wireless device corresponding to the customer and configured to send the wireless network connection request upon entering the brick and mortar store;
determining that the wireless network connection request corresponds to a second indicia of customer interest for the product;
determining a product profitability profile based on the first indicia, the second indicia, and the online indicia, the product profitability profile comprising a sales channel identifying where to offer the product;
determining whether an actual product profitability for the product satisfies a sales channel threshold for the product, the actual product profitability corresponding to revenue generated by the product, the sales channel threshold indicating an acceptable profit for the product within the sales channel and input from an administrative device associated with an entity that owns the brick and mortar store; and
when the actual product profitability satisfies the sales channel threshold, transmitting a profitability profile alert to the administrative device, the profitability profile alert when received by the administrative device causes the administrative device to display instructions on a display in communication with the administrative device, the display instructions indicating product management options, the product management options configured to:
adjust a price related to the product;
recommend an increase in marketing related to the product; or
determine a new sales channel for the product, the new sales channel replacing the sales channel of the product profitability profile.

12. The system of claim 11, wherein the operations further comprise determining that the wireless network connection request corresponds to a customer profile with additional customer information, the additional customer information comprising at least one of a purchase transaction history, loyalty program information, or a wireless network connection request history.

13. The system of claim 11, wherein the selection input at the interactive data collection comprises at least one of a search input relating to the product or a viewing input of the product.

14. The system of claim 11, wherein the selection input corresponds to the customer accessing a stock keeping unit (SKU) of the product on the interactive data collection system.

15. The system of claim 11, wherein the operations further comprise:
segmenting each indicia of the first indicia, the second indicia, and the online indicia into a first geographic region and a second geographic region based on a location where each indicia was obtained; and
determining, for the product profitability profile, a first sales channel to offer the product in the first geographic region and a second sales channel to offer the product for purchase in the second geographic region, the first sales channel different from the second sales channel.

16. The system of claim 15, wherein the operations further comprise:
determining that the actual product profitability of the second sales channel is more profitable than the first sales channel; and
offering the product for sale in the second sales channel and removing the product from the first sales channel.

17. The system of claim 11, wherein the sales channel of the product profitability profile is selected from a plurality of channels comprising a plurality of in-store channels and a plurality of online channels, the in-store channels corresponding to a greater degree of customer interest than the online channels.

18. The system of claim 17, wherein the plurality of in-store channels comprises:
a first channel corresponding to high visibility areas for customers within the brick and mortar store; and
a second channel corresponding to low visibility areas for customers within the brick and mortar store.

19. The system of claim 11, wherein the interactive data collection system comprises a touch screen display disposed within the brick and mortar store accessible to customers.

20. The system of claim 11, wherein the operations further comprise:
receiving third party indicia of customer interest relating to the product, the third party indicia corresponding to third party metrics for customer interest; and
determining the product profitability profile based on the first indicia, the second indicia, the online indicia, and the third party indicia.

* * * * *